Patented Jan. 13, 1942

2,269,652

UNITED STATES PATENT OFFICE 2,269,652

METHOD FOR THE PREPARATION OF ISOCYTOSINE

Jackson P. English and Richard Owen Roblin, Jr., Stamford, Conn., assignors to American Cyanamid Company, New York, N. Y., a corporation of Maine No Drawing. Application August 6, 1941, Serial No. 405,686

14 Claims. (Cl. 260—251)

This invention relates to a process of producing isocytosine.

Isocytosine has been prepared in the past by the reaction of guanidine salts with formylacetic acid in the form of a reaction mixture of malic acid and oleum. This process gives good yields but some manipulative difficulties are encountered due to the fact that the malic acid is a solid.

According to the present invention instead of using malic acid and oleum an ether or ester of an oxysuccinic acid is used having the formula:

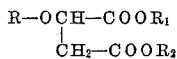

in which R, $R_1$ and $R_2$ are hydrogen or alkyl, at least one being an alkyl group. The compounds are, for the most part, liquids particularly when two or more of the R's are alkyl. The liquids permit much easier manipulation than does solid malic acid and the yields are good.

The guanidine salt to be used is not vital, any ordinary guanidine salt being employed such as for example, guanidine sulfate, hydrochloride and the like. In the presence of the strong sulfuric acid, however, guanidine sulfate is probably formed regardless of which salt is added and we prefer therefore to use guanidine sulfate.

It is desirable although not essential, to cool the reaction mixture at first and this can be easily effected by first forming a chilled mixture of oleum and the guanidine salt and then adding the alkoxy ester or ether.

The invention will be described in greater detail in conjunction with the following specific examples. The parts are by weight.

Example 1

140 parts of 20% oleum was cooled to —5° C. and 12.3 parts of guanidine sulfate stirred in at this temperature. 17.6 parts of dimethyl methoxy succinate was then added and the whole was warmed slowly to 98° C. The reaction was stirred at this temperature for one hour. The mixture was cooled and poured into 126 parts of cold methanol. The precipitate was filtered off, suspended in water and made neutral by the addition of 70-75 parts of aqueous ammonia. The precipitate of isocytosine was filtered off and dried.

Example 2

140 parts of 20% oleum was cooled to —5° C. and 12.3 parts of guanidine sulfate was stirred in 21.8 parts of diethyl ethoxysuccinate was added and the whole was warmed slowly to 98° C. The reaction was stirred for one hour at this temperature, cooled, and poured into 126 parts of cold methanol. The precipitate was collected, suspended in water, and neutralized with concentrated aqueous ammonia. The precipitated isocytosine was collected and dried.

Example 3

140 parts of 20% oleum was cooled to —5° C. and 12.3 parts of guanidine sulfate was stirred in. 16.2 parts of dimethyl malate was added and the mixture was warmed slowly to 98° C. The reaction was heated at this temperature for one hour, cooled, and poured into 126 parts of cold methanol. The precipitate was collected, suspended in water, and neutralized with concentrated aqueous ammonia. The collected isocytosine was dried.

Example 4

140 parts of 20% oleum was cooled to —5° C. and 12.3 parts of guanidine sulfate was stirred in. 19 parts of the monoethyl ester of ethoxy-succinic acid was added, the mixture was heated to 98° C., and held at this temperature for one hour. The cooled solution was poured into 126 parts of methanol and the precipitate collected. The solid was suspended in water and neutralized with concentrated aqueous ammonia. The isocytosine was filtered off and dried.

Example 5

130 parts of 20% oleum was cooled to —5° C. and 9.9 parts of guanidine carbonate was stirred in. 21.8 parts of diethyl ethoxysuccinate was added and the reaction mixture was heated at 98° C. for one hour. The cooled solution was pouredf into 117 parts of cold methanol and the precipitate collected. This solid was suspended in water and neutralized with concentrated ammonia. The precipitated isocytosine was filtered off and dried.

We claim:

1. A method of producing isocytosine which comprises reacting a guanidine salt with the reaction product of fuming sulfuric acid and a compound having the formula:

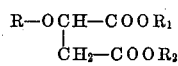

in which R, $R_1$ and $R_2$ are members of the group consisting of hydrogen and alkyl, at least one of which is alkyl.

2. A method of producing isocytosine which comprises reacting a guanidine salt with the reaction product of fuming sulfuric acid and a compound having the following formula:

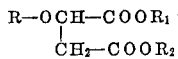

in which R, R₁ and R₂ are members of the group consisting of hydrogen and alkyl, at least two of which are alkyl.

3. A method of producing isocytosine which comprises reacting a guanidine salt with the reaction product of fuming sulfuric acid and a compound having the formula:

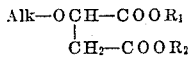

in which R₁ and R₂ are members of the group consisting of hydrogen and alkyl, at least one of which is alkyl, and Alk is alkyl.

4. A method of producing isocytosine which comprises reacting a guanidine salt with the reaction product of fuming sulfuric acid and a di-ester of alkoxysuccinic acid.

5. A method of producing isocytosine which comprises adding a compound of the formula:

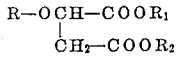

in which R, R₁ and R₂ are members of the group consisting of hydrogen and alkyl, at least one of which is alkyl, to a cold solution of a guanidine salt in fuming sulfuric acid and heating the reaction mixture after the addition until the reaction is substantially complete.

6. A method of producing isocytosine which comprises adding a compound of the formula:

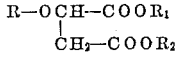

in which R, R₁ and R₂ are members of the group consisting of hydrogen and alkyl, at least two of which are alkyl, to a cold solution of a guanidine salt in fuming sulfuric acid and heating the reaction mixture after the addition until the reaction is substantially complete.

7. A method of producing isocytosine which comprises adding a compound of the formula:

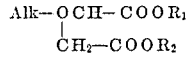

in which R₁ and R₂ are members of the group consisting of hydrogen and alkyl, at least one of which is alkyl, and Alk is alkyl, to a cold solution of a guanidine salt in fuming sulfuric acid and heating the reaction mixture after the addition until the reaction is substantially complete.

8. A method of producing isocytosine which comprises adding a diester of an alkoxysuccinic acid to a cold solution of a guanidine salt in fuming sulfuric acid and heating the reaction mixture after the addition until the reaction is substantially complete.

9. A method according to claim 4 in which the compound is dimethyloxysuccinate.

10. A method according to claim 1 in which the reaction mixture is poured into cold methanol and isocytosine sulfate is recovered by filtration.

11. A method according to claim 2 in which the reaction mixture is poured into cold methanol and isocytosine sulfate is recovered by filtration.

12. A method according to claim 3 in which the reaction mixture is poured into cold methanol and isocytosine sulfate is recovered by filtration.

13. A method according to claim 4 in which the reaction mixture is poured into cold methanol and isocytosine sulfate is recovered by filtration.

14. A method according to claim 4 in which the compound is diethyloxysuccinate.

JACKSON P. ENGLISH.
RICHARD OWEN ROBLIN, Jr.